US012548933B2

United States Patent

Yamada et al.

(12) United States Patent
(10) Patent No.: US 12,548,933 B2
(45) Date of Patent: Feb. 10, 2026

(54) TERMINAL UNIT, FEMALE TERMINAL AND MALE TERMINAL

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Yusuke Yamada, Mie (JP); Katsuhiko Aizawa, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 368 days.

(21) Appl. No.: 18/277,905

(22) PCT Filed: Feb. 18, 2022

(86) PCT No.: PCT/JP2022/006650
§ 371 (c)(1),
(2) Date: Aug. 18, 2023

(87) PCT Pub. No.: WO2022/185955
PCT Pub. Date: Sep. 9, 2022

(65) Prior Publication Data

US 2024/0128672 A1 Apr. 18, 2024

(30) Foreign Application Priority Data

Mar. 4, 2021 (JP) ................................ 2021-034512

(51) Int. Cl.
*H01R 13/115* (2006.01)
*H01R 13/04* (2006.01)

(52) U.S. Cl.
CPC ........... *H01R 13/115* (2013.01); *H01R 13/04* (2013.01)

(58) Field of Classification Search
CPC .... H01R 13/115; H01R 13/04; H01R 13/113; H01R 13/11
See application file for complete search history.

(56) References Cited

U.S. PATENT DOCUMENTS 4,415,221 A * 11/1983 Inoue ..................... H01R 13/20 439/849
4,691,981 A * 9/1987 Coldren ................. H01R 13/05 439/849

(Continued)

FOREIGN PATENT DOCUMENTS

JP H05-087837 U1 11/1993
JP 2001-351712 A 12/2001

(Continued)

OTHER PUBLICATIONS

International Search Report issued on Apr. 19, 2022 for WO 2022/185955 A1 (6 pages).

*Primary Examiner* — Vanessa Girardi
(74) *Attorney, Agent, or Firm* — Venjuris, P.C.

(57) ABSTRACT

In a terminal unit, a second contact portion of a female terminal includes a push-up protrusion projecting toward a first contact portion and a pair of first projecting contact point portions, to be respectively brought into contact with a pair of inclined portions, of a male terminal. The male terminal includes an accommodation recess capable of accommodating the push-up protrusion. In an incomplete connection state, the male terminal is in contact with the push-up protrusion and pushed up toward the first contact (Continued)

portion, whereby the inclined portions of the male terminal are separated from the first projecting contact point portions of the female terminal. In a complete connection state, the inclined portions of the male terminal are pressed by the first projecting contact point portions of the female terminal.

10 Claims, 6 Drawing Sheets

(56) References Cited

U.S. PATENT DOCUMENTS

| | | | | |
|---|---|---|---|---|
| 4,764,133 | A * | 8/1988 | Kaneko .................. | H01R 13/04 439/850 |
| 5,281,178 | A * | 1/1994 | Biscorner ............ | H01R 13/052 439/850 |
| 6,293,832 | B1 | 9/2001 | Yamamoto | |
| 9,270,043 | B2 * | 2/2016 | Kobayashi ............. | H01R 13/02 |
| 9,666,957 | B2 * | 5/2017 | Endo .................... | H01R 13/113 |
| 2017/0033487 | A1 | 2/2017 | Onuma et al. | |
| 2019/0157786 | A1 | 5/2019 | Horiuchi | |
| 2024/0154335 | A1 * | 5/2024 | Yamada ................. | H01R 13/04 |

FOREIGN PATENT DOCUMENTS

| | | | |
|---|---|---|---|
| JP | 2009-277436 | A | 11/2009 |
| JP | 2014-078355 | A | 5/2014 |
| JP | 2015-222621 | A | 12/2015 |
| JP | 2017-204396 | A | 11/2017 |

* cited by examiner

TERMINAL UNIT, FEMALE TERMINAL AND MALE TERMINAL

CROSS REFERENCE TO RELATED APPLICATIONS

This application is a national phase of PCT application No. PCT/JP2022/006650, filed on 18 Feb. 2022, which claims priority from Japanese patent application No. 2021-034512, filed on 4 Mar. 2021, all of which are incorporated herein by reference.

TECHNICAL FIELD

The present disclosure relates to a terminal unit and a female terminal and a male terminal used for this terminal unit.

BACKGROUND

Patent Document 1 discloses a terminal unit composed of a male terminal having a plate-like shape expressed as a tab-like shape and a female terminal to be connected to the male terminal. The female terminal includes a pair of wall portions arranged to face each other across a male terminal insertion gap, one wall portion is provided with a resilient contact piece for pressing the male terminal against the other wall portion and a plurality of contact points are provided to project on the other wall portion.

PRIOR ART DOCUMENT

Patent Document

Patent Document 1: JP 2017-204396 A

SUMMARY OF THE INVENTION

Problems to be Solved

Since the terminal unit of Patent Document 1 is structured to sandwich the flat plate-like male terminal by the pair of wall portions of the female terminal, a gripping force against an external force acting in a plate width direction of the male terminal is small. Thus, an increase of a contact resistance value is also conceivable due to fine sliding friction between the male and female terminals caused by vibration or the like. Further, in the case of press-fitting the male terminal into the male terminal insertion gap or pulling out the male terminal from the male terminal insertion gap, a pressure between contact surfaces of the male and female terminals increases when the male terminal rides on the contact points provided to project on the female terminal. Thus, a possibility of scraping plating provided on the surfaces of the male terminal and contact point parts of the female terminal is conceivable. Therefore, a further improvement of the terminal unit has been required.

Accordingly, a terminal unit capable of suppressing a displacement of a male terminal in a plate width direction with respect to a female terminal and suppressing plating scraping at contact points when the male terminal is inserted into or withdrawn from the female terminal, and a female terminal and a male terminal used for the terminal unit are disclosed.

Means to Solve the Problem

A terminal unit of the present disclosure is provided with a plate-like male terminal and a female terminal to be connected to the male terminal, the female terminal including a first contact portion and a second contact portion arranged to face each other across a male terminal press-fit gap, the male terminal being press-fit into and arranged in the male terminal press-fit gap, the first and second contact portions sandwiching the male terminal, the male terminal including a pair of inclined portions on both sides in a first direction intersecting a press-fitting direction into the male terminal press-fit gap, the pair of inclined portions being inclined toward one side in a plate thickness direction of the male terminal, the first contact portion of the female terminal facing a surface of the male terminal on the one side in the plate thickness direction, the second contact portion of the female terminal facing a surface of the male terminal on the other side in the plate thickness direction and including a push-up protrusion projecting toward the first contact portion and a pair of side edge parts respectively facing the pair of inclined portions of the male terminal, the pair of side edge parts including a pair of first projecting contact point portions to be respectively brought into contact with the pair of inclined portions, the pair of first projecting contact point portions and the push-up protrusion being provided at positions different in the first direction, the male terminal including an accommodation recess open in the surface on the other side in the plate thickness direction, arranged closer to a base end than a tip part in the press-fitting direction and capable of accommodating the push-up protrusion, the male terminal being in contact with the push-up protrusion and pushed up toward the first contact portion, whereby the inclined portions of the male terminal are separated from the first projecting contact point portions of the female terminal, in an incomplete connection state where the push-up protrusion of the second contact portion is not fit in the accommodation recess of the male terminal press-fit in the male terminal press-fit gap, and the inclined portions of the male terminal being pressed by the first projecting contact point portions of the female terminal in a complete connection state where the push-up protrusion of the second contact portion is fit in the accommodation recess of the male terminal press-fit in the male terminal press-fit gap.

A female terminal of the present disclosure is a female terminal used in the terminal unit of the present disclosure.

A male terminal of the present disclosure is a male terminal used in the terminal unit of the present disclosure.

Effect of the Invention

According to the present disclosure, it is possible to provide a terminal unit capable of suppressing a displacement of a male terminal in a plate width direction with respect to a female terminal and suppressing plating scraping at contact points when the male terminal is inserted into or withdrawn from the female terminal and a female terminal and a male terminal used for the terminal unit.

DETAILED DESCRIPTION TO EXECUTE THE INVENTION

Description of Embodiments of Present Disclosure

Figure 1:
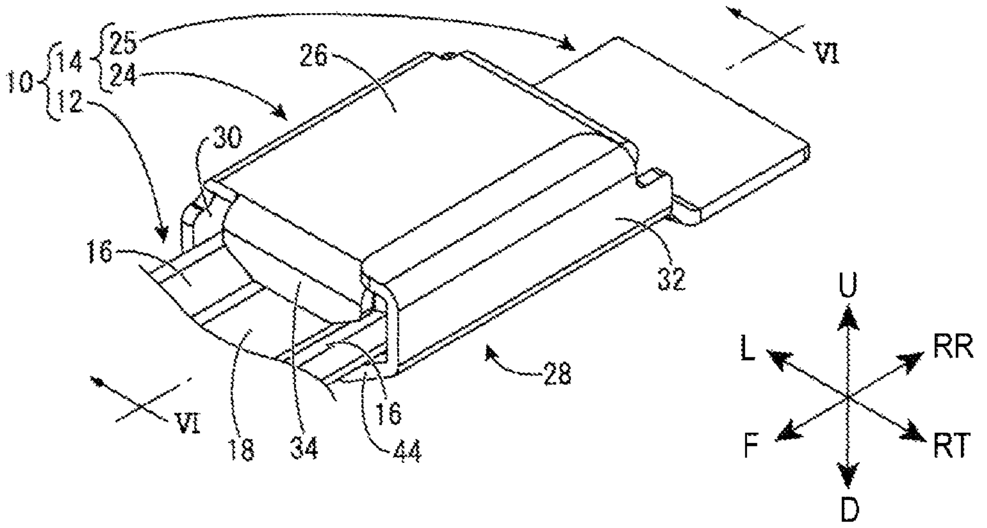
FIG. 1 is a perspective view showing a terminal unit according to one embodiment in a complete connection state.
Figure 2:
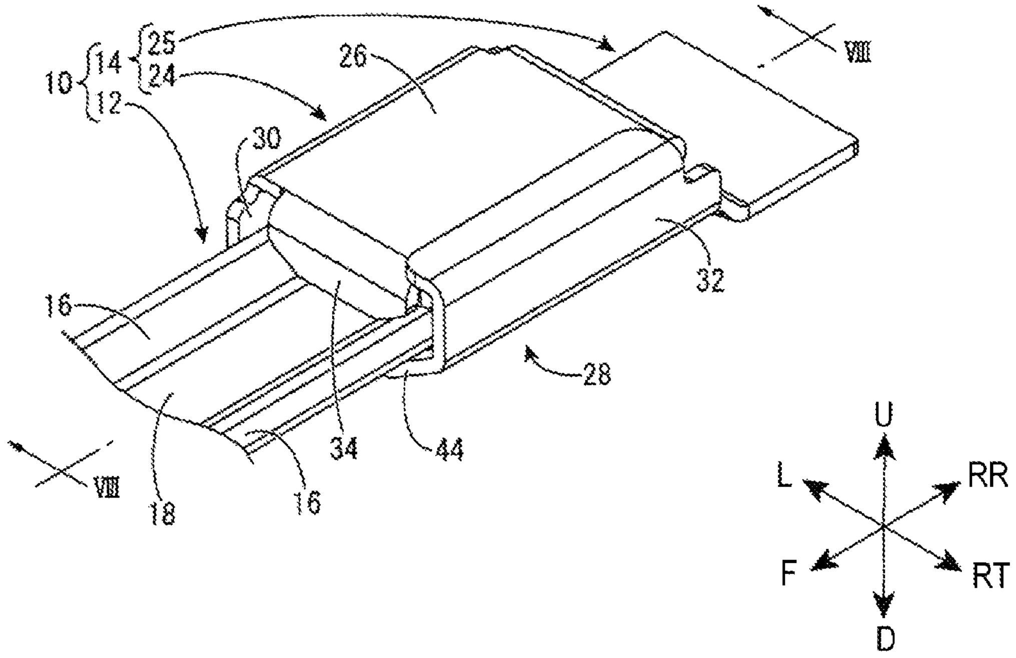
FIG. 2 is a perspective view showing the terminal unit according to the embodiment in an incomplete connection state.

First, embodiments of the present disclosure are listed and described.

(1) The terminal unit of the present disclosure is provided with a plate-like male terminal and a female terminal to be connected to the male terminal, the female terminal including a first contact portion and a second contact portion arranged to face each other across a male terminal press-fit gap, the male terminal being press-fit into and arranged in the male terminal press-fit gap, the first and second contact portions sandwiching the male terminal, the male terminal including a pair of inclined portions on both sides in a first direction intersecting a press-fitting direction into the male terminal press-fit gap, the pair of inclined portions being inclined toward one side in a plate thickness direction of the male terminal, the first contact portion of the female terminal facing a surface of the male terminal on the one side in the plate thickness direction, the second contact portion of the female terminal facing a surface of the male terminal on the other side in the plate thickness direction and including a push-up protrusion projecting toward the first contact portion and a pair of side edge parts respectively facing the pair of inclined portions of the male terminal, the pair of side edge parts including a pair of first projecting contact point portions to be respectively brought into contact with the pair of inclined portions, the pair of first projecting contact point portions and the push-up protrusion being provided at positions different in the first direction, the male terminal including an accommodation recess open in the surface on the other side in the plate thickness direction, arranged closer to a base end than a tip part in the press-fitting direction and capable of accommodating the push-up protrusion, the male terminal being in contact with the push-up protrusion and pushed up toward the first contact portion, whereby the inclined portions of the male terminal are separated from the first projecting contact point portions of the female terminal, in an incomplete connection state where the push-up protrusion of the second contact portion is not fit in the accommodation recess of the male terminal press-fit in the male terminal press-fit gap, and the inclined portions of the male terminal being pressed by the first projecting contact point portions of the female terminal in a complete connection state where the push-up protrusion of the second contact portion is fit in the accommodation recess of the male terminal press-fit in the male terminal press-fit gap.

According to the terminal unit of the present disclosure, the female terminal includes the first and second contact portions arranged to face each other across the male terminal press-fit gap, and is structured such that the male terminal press-fit into the male terminal press-fit gap is sandwiched by the first and second contact portions. The male terminal includes the pair of inclined portions inclined toward the one side in the plate thickness direction of the male terminal on the both sides in the plate width direction of the male terminal, which is a direction intersecting the press-fitting direction into the male terminal press-fit gap. The female terminal includes the pair of side edge parts respectively facing the pair of inclined portions of the male terminal in the second contact portion facing the surface of the male terminal on the other side in the plate thickness direction, and the pair of side edge parts include the pair of first projecting contact point portions to be respectively brought into contact with the pair of inclined portions.

Here, the second contact portion of the female terminal includes the push-up protrusion provided at the position different from the first projecting contact point portions in the first direction intersecting the press-fitting direction, and the male terminal includes the accommodation recess arranged on the side closer to the base end than the tip part in the press-fitting direction of the male terminal and capable of accommodating the push-up protrusion. In this way, the male terminal is pushed toward the first contact portion by the male terminal being press-fit while sliding in contact with the push-up protrusion in the incomplete connection state before the push-up protrusion of the second contact portion is fit into the accommodation recess of the male terminal press-fit into the male terminal press-fit gap. As a result, the inclined portions of the male terminal are held in a state separated from the first projecting contact point portions of the female terminal. In addition, the push-up protrusion is provided at the position different from the first projecting contact point portions in the first direction. In this way, a part of the male terminal to be rubbed by the push-up protrusion according to the press-fitting of the male terminal can be made different from parts to be contacted by the first projecting contact point portions. Therefore, it is possible to suppress a problem of plating scraping at the first projecting contact point portions of the female terminal and contact parts of the male terminal with the first projecting contact point portions.

In the complete connection state where the push-up protrusion of the second contact portion is fit in the accommodation recess of the male terminal press-fit into the male terminal press-fit gap, the inclined portions of the male terminal are pressed by the first projecting contact point portions of the female terminal and a stable connected state of the male and female terminals is maintained. At this time, the inclined portions of the male terminal are pressed by the first projecting contact point portions of the female terminal on the both sides in the plate width direction of the male terminal, and component forces (reaction forces from the first projecting contact point portions) acting inward in the plate width direction are generated. As a result, a force for preventing a displacement of the male terminal can be increased against an external force acting outward in the plate width direction of the male terminal, and a displacement of the male terminal in the plate thickness direction with respect to the female terminal can be suppressed as compared to conventional structures. As a result, it is possible to suppress fine sliding friction between the male and female terminals due to vibration or the like and an increase of a contact resistance value caused by the fine sliding friction. As just described, according to the terminal unit of the present disclosure, both the suppression of plating scraping at contact points when the male terminal is inserted into and withdrawn from the female terminal and the suppression of a displacement of the male terminal in the plate width direction with respect to the female terminal can be accomplished.

Note that any structure can be adopted for the first and second contact portions of the female terminal as long as the male terminal is allowed to be press-fit into the male terminal press-fit gap and the male terminal can be sandwiched between the first and second contact portions. For example, if at least one of the first and second contact portions is displaceable in a direction opposite to a facing direction across the male terminal press-fit gap and the first and second contact portions are biased in the facing direction across the male terminal press-fit gap, arbitrary structures can be adopted.

(2) Preferably, the second contact portion of the female terminal includes an intermediate part located between the pair of side edge parts in the first direction, and the pair of side edge parts are inclined toward the male terminal press-fit gap with respect to the intermediate part. Since the pair of side edge parts provided with the pair of first projecting contact point portions are bent and inclined toward the male terminal press-fit gap, reaction forces from the pair of first projecting contact point portions respectively in contact with the pair of inclined portions of the male terminal and generated in directions perpendicular to the pair of side edge parts can also be caused to act inward in the plate width direction of the male terminal on the both sides in the plate width direction of the male terminal. In this way, a force for preventing a displacement of the male terminal can be increased against an external force acting in the plate width direction of the male terminal, more advantageously utilizing reaction forces from the first projecting contact point portions. Therefore, a displacement of the male terminal in the plate width direction with respect to the female terminal can be suppressed.

(3) Preferably, the push-up protrusion is provided in the intermediate part of the second contact portion. In the second contact portion of the female terminal, the first projecting contact point portions and the push-up protrusion can be separately formed in the pair of side edge parts and the intermediate part. In this way, the first projecting contact point portions and the push-up protrusion can be separated across gaps. Thus, it can be suppressed that plating scraping caused by a sliding movement of the male terminal against the push-up protrusion affects contact parts with the first projecting contact point portions. In this way, an effect of suppressing plating scraping can be improved. Further, the first projecting contact point portions and the push-up protrusion can be partially overlapped in an inserting direction of the male terminal. As a result, an increase in the formation region of the first projecting contact point portions and an increase in the contact area of the female terminal with the male terminal by the increase in the formation region can be achieved while the effect of suppressing plating scraping at the contact point by the push-up protrusion and the size reduction of the terminal unit are achieved.

(4) Preferably, at least a part of the push-up protrusion is arranged forward of the pair of first projecting contact point portions in the inserting direction of the male terminal. In this way, the male terminal can be suppressed from contacting the first projecting contact point portions before being press-fit into the male terminal press-fit gap. Therefore, it is possible to suppress a problem of plating scraping at the first projecting contact point portions of the female terminal according to the press-fitting of the male terminal.

(5) Preferably, a projecting dimension of the push-up protrusion is smaller than those of the first projecting contact point portions. By reducing the projecting dimension of the push-up protrusion, the accommodation recess of the male terminal for accommodating the push-up protrusion can also be made smaller accordingly. As a result, an increase in the conduction resistance of the male terminal by the accommodation recess can be suppressed.

(6) Preferably, the male terminal includes a flat portion arranged between the pair of inclined portions in the plate width direction, the first contact portion of the female terminal includes a resilient contact portion projecting toward the second contact portion, resiliently deformable in a direction separating from the second contact portion and configured to bias the male terminal toward the second contact portion, and the resilient contact portion includes a second projecting contact portion to be brought into contact with the flat portion of the male terminal. The second projecting contact point portion of the female terminal is pressed against the flat portion of the male terminal from the one side in the plate thickness direction of the male terminal, and the first projecting contact point portions of the female terminal are pressed against the pair of inclined portions of the male terminal from the other side in the plate thickness direction of the male terminal. In this way, the male terminal can be stably held by three contact point portions of the female terminal and a contact resistance can be reduced.

(7) Preferably, the male terminal includes a flat portion arranged between the pair of inclined portions in the plate width direction and an angle of inclination of the pair of inclined portions with respect to the flat portion is θ1, the second contact portion of the female terminal includes an intermediate part in the form of a flat plate arranged between the pair of side edge parts and an angle of inclination of the pair of side edge parts with respect to the intermediate part is θ2, and the angle of inclination θ1 is equal to the angle of inclination θ2 or different therefrom within a range of 10°. The male terminal and the second contact portion of the female terminal have corresponding shapes, and the angle of inclination θ1 of the pair of inclined portions with respect to the flat portion is set equal to the angle of inclination θ2 of the pair of side edge parts with respect to the intermediate part or different therefrom within the range of 10°. In this way, a force for preventing a displacement of the male terminal can be increased against an external force acting outward in the plate width direction of the male terminal while the terminal unit is reduced in size.

(8) Preferably, each first projecting contact point portion continuously extends in the inserting direction of the male terminal into the male terminal press-fit gap. Since the first projecting contact point portions continuously extend in the inserting direction of the male terminal, a contact area between the male and female terminals can be stably secured and a contact pressure between the both terminals can also be reduced.

(9) The female terminal of the present disclosure is the female terminal used in the terminal unit of any one of (1) to (8) described above. Since being used in the terminal unit of any one of (1) to (8) described above, the female terminal of the present disclosure can similarly have functions and effects enjoyable by the terminal units of (1) to (8) described above. Therefore, both the suppression of plating scraping at contact points when the male terminal is inserted into and withdrawn from the female terminal and the suppression of a displacement of the male terminal in the plate width direction with respect to the female terminal can be accomplished.

(10) The male terminal of the present disclosure is the male terminal used in the terminal unit of any one of (1) to (8) described above. Since being used in the terminal unit of any one of (1) to (8) described above, the male terminal of the present disclosure can similarly have functions and effects enjoyable by the terminal units of (1) to (8) described above. Therefore, both the suppression of plating scraping at contact points when the male terminal is inserted into and withdrawn from the female terminal and the suppression of a displacement of the male terminal in the plate width direction with respect to the female terminal can be accomplished.

Details of Embodiment of Present Disclosure

Specific examples of a terminal module of the present disclosure and a female terminal and a male terminal used for the terminal unit are described below with reference to the drawings. Note that the present disclosure is not limited to these illustrations, but is represented by claims and intended to include all changes in the scope of claims and in the meaning and scope of equivalents.

Embodiment

A terminal unit 10 of one embodiment of the present disclosure is described below using FIGS. 1 to 9. The terminal unit 10 is provided with a male terminal 12 and a female terminal 14. The male terminal 12 and the female terminal 14 are electrically connected by inserting the male terminal 12 into the female terminal 14 and bringing these terminals into contact. Note that although the terminal unit 10 can be arranged in an arbitrary orientation, a vertical direction, a lateral direction and a front-rear direction are based on a vertical direction, a lateral direction and a front-rear direction shown in figures in the following description. Further, for a plurality of identical members, only some members may be denoted by a reference sign and the other members may not be denoted by the reference sign.

Male Terminal 12

The male terminal 12 has a plate-like shape as a whole, and is formed using an unillustrated flat plate fitting. The flat plate fitting has a rectangular shape, has predetermined plate width (lateral dimension in FIG. 7) and plate thickness (vertical dimension in FIG. 7) and extends straight. Note that, in the male terminal 12, an end part on a tip side (rear side in FIG. 6) in an inserting direction has a tapered shape (see FIG. 6). The male terminal 12 is electrically conductive and, for example, formed of metal having a low electrical resistance such as copper, copper alloy, aluminum or aluminum alloy.

By bending and inclining both end parts in the plate width direction of the flat plate fitting toward one side (upper side) in the plate thickness direction, a pair of inclined portions 16, 16 are provided on both end parts in the plate width direction of the male terminal 12. That is, in the male terminal 12, the pair of inclined portions 16, 16 are provided on both sides in a direction intersecting the inserting direction into a male terminal press-fit gap 22 to be described later, i.e. in the plate width direction, which is a first direction orthogonal to the inserting direction in this embodiment. An intermediate part in the plate width direction located between the pair of inclined portions 16, 16 in the plate width direction of the male terminal 12 is provided with a flatly extending flat portion 18. An angle of inclination of the pair of inclined portions 16, 16 with respect to the flat portion 18 is θ1 (see FIG. 7). In the embodiment of the present disclosure, the first direction is a direction orthogonal to a press-fitting direction and means the plate width direction of the male terminal 12.

The angle of inclination θ1 of the pair of inclined portions 16, 16 with respect to the flat portion 18 is not limited, but is preferably 5° or more and 45° or small, more preferably 10° or more and 30° or less. By setting the angle of inclination θ1 of the inclined portions 16 to 5° or more, a component force can be effectively made to act inward in the plate width direction when an external force acting outward in the plate width direction is input to the male terminal 12, and an outward displacement of the male terminal 12 in the plate width direction can be suppressed. By setting the angle of inclination θ1 of the inclined portions 16 to 45° or less, a vertical dimension of the male terminal 12, consequently the terminal unit 10, can be suppressed to be small.

As described later, with the male terminal 12 press-fit and arranged in the male terminal press-fit gap 22 of the female terminal 14, one surface (upper surface) of the male terminal 12 in the plate thickness direction is arranged to face a first contact portion 26 of the female terminal 14, and the other surface (lower surface) in the plate thickness direction is arranged to face a second contact portion 28 of the female terminal 14. In this way, the male terminal 12 is sandwiched by the first and second contact portions 26, 28 of the female terminal 14.

Further, the male terminal 12 includes an accommodation recess 20 open in the surface (lower surface) on the other side in the plate thickness direction, arranged closer to abase end than a tip part 52 in the press-fitting direction and capable of accommodating a push-up protrusion 50 to be described later.

In the male terminal 12, an unillustrated flat plate portion extending straight is provided on a side closer to the base end (front side in figures) in the inserting direction than a formation region of the inclined portions 16, 16. The flat plate portion is, for example, provided with a bolt insertion hole, and is fixed to a terminal portion of a device or a wire.

Female Terminal 14

Figure 3:
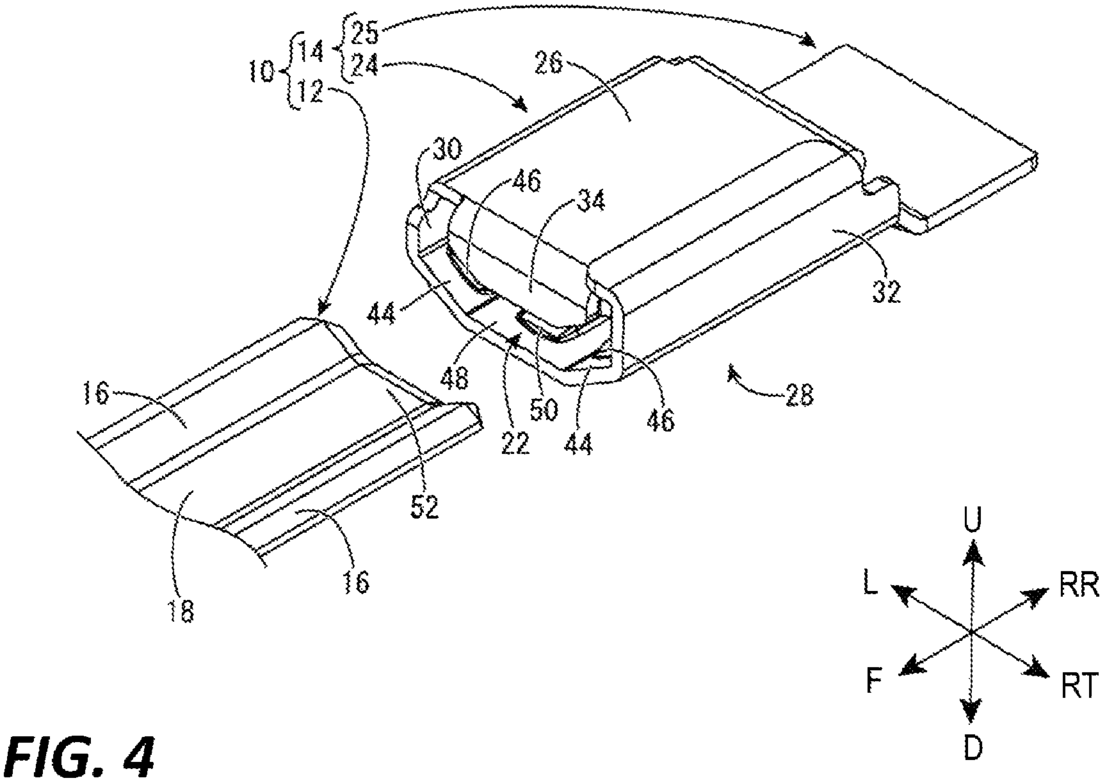
FIG. 3 is an exploded perspective view of FIG. 1.
Figure 4:
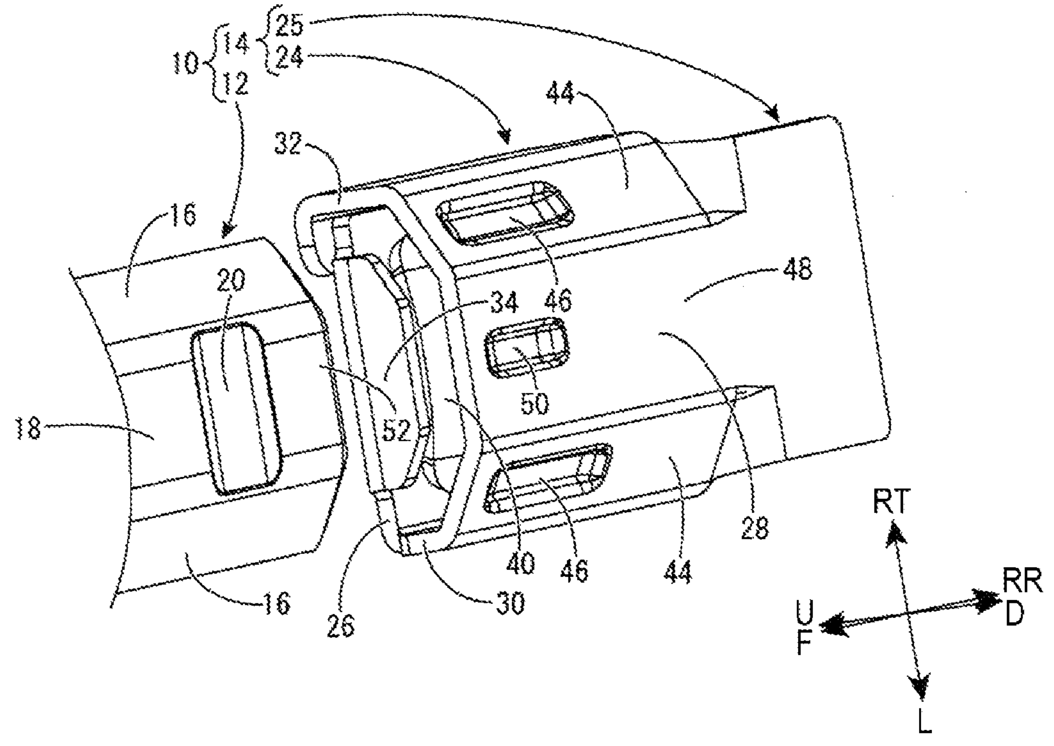
FIG. 4 is a perspective view of FIG. 3 when viewed from another direction.
Figure 6:
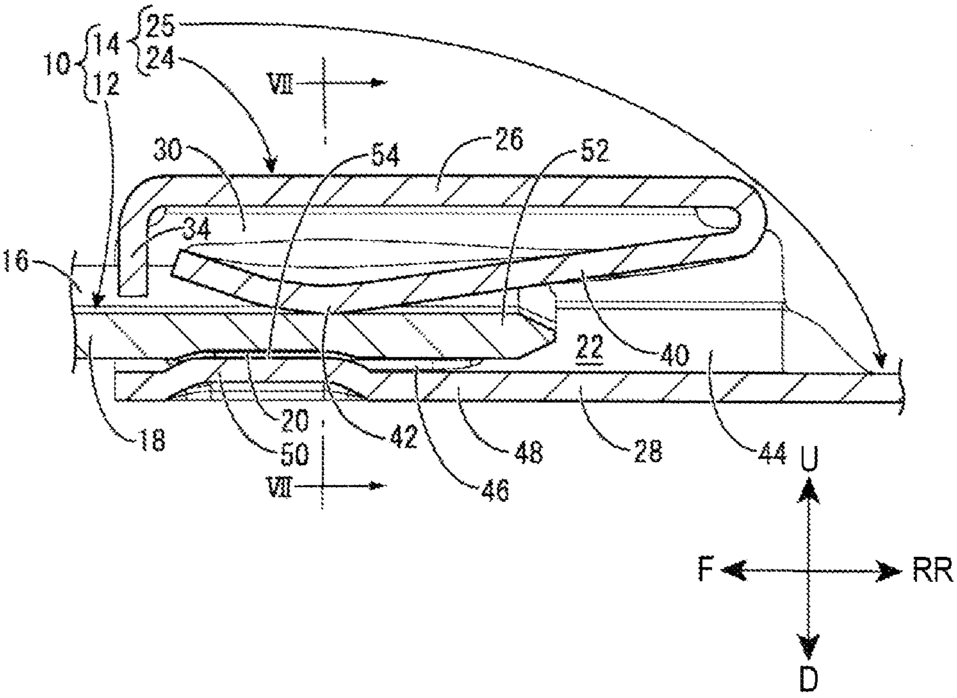
FIG. 6 is an enlarged section along VI-VI in FIG. 1.

For example, as shown in FIGS. 3 and 6, the female terminal 14 is integrally configured to include a box-shaped body portion 24 having the male terminal press-fit gap 22 open in the front-rear direction inside and a wire connecting portion 25 to be fixed to a core wire of an unillustrated wire. More particularly, the female terminal 14 is electrically conductive and formed using one of various materials such as brass, copper, copper alloy, aluminum and aluminum alloy, which can be press-worked or punched.

Body Portion 24

The body portion 24 is substantially in the form of a box and includes the first and second contact portions 26, 28 facing each other in the vertical direction and a pair of side walls 30, 32 facing each other in the lateral direction. In addition, the body portion 24 includes a protection wall 34 for covering a projecting tip part of a resilient contact portion 40 to be described later from front.

The resilient contact portion 40 in the form of a tongue piece is provided to extend on the rear end of the first contact portion 26 located on an upper side, and formed by being folded inwardly of the body portion 24 from the rear end of the first contact portion 26 as shown in FIG. 6. A tip part of the resilient contact portion 40 is bent upward after the resilient contact portion 40 extends straight in an oblique direction toward a front side and an axial center from the rear end of the first contact portion 26. That is, the resilient contact portion 40 has a rear end side held in a cantilevered manner on the first contact portion 26, and projects forward while gradually approaching the second contact portion 28. As a result, the resilient contact portion 40 includes a second projecting contact point portion 42 to be brought into contact with the upper surface of the flat portion 18 of the male terminal 12 (see FIGS. 6 and 7). The tip part 52 of the male terminal 12 is insertable into a gap between the resilient contact portion 40 and the second contact portion 28. By inserting the male terminal 12 between the resilient contact portion 40 and the second contact portion 28, the resilient contact portion 40 is resiliently deformable in a direction separating from the second contact portion 28. As a result, the resilient contact portion 40 biases the male terminal 12 toward the second contact portion 28.

The protection wall 34 in the form of a rectangular flat plate projecting toward the second contact portion 28 while having a width smaller than a separation distance between the pair of side walls 30 and 32 is provided on the front end of the first contact portion 26 located on the upper side. The tip part 52 of the male terminal 12 is insertable through a gap between a projecting tip part of the protection wall 34 and the second contact portion 28. As shown in FIG. 6, the protection wall 34 is configured to cover the projecting tip part of the resilient contact portion 40 from front. In this way, the resilient contact portion 40 is protected from abnormal deformation caused by the contact of the tip part 52 of the male terminal 12 with the projecting tip part of the resilient contact portion 40.

The second contact portion 28 located on a lower side includes a pair of side edge parts 44, 44 respectively configured to face the pair of inclined portions 16, 16 of the male terminal 12, and an intermediate part 48 in the form of a flat plate located between the pair of side edge parts 44, 44 in the plate width direction, which is the first direction. The pair of side edge parts 44, 44 are inclined toward the male terminal press-fit gap 22 with respect to the intermediate part 48 and provided with a pair of first projecting contact point portions 46, 46 to be respectively brought into contact with the pair of inclined portions 16, 16. Further, the intermediate part 48 is provided with the push-up protrusion 50 projecting toward the first contact portion 26. That is, the pair of first projecting contact portions 46, 46 and the push-up protrusion 50 are provided at positions different in the plate width direction of the male terminal 12, which is the first direction. An angle of inclination of the pair of side edge parts 44, 44 with respect to the intermediate part 48 is θ2 (see FIG. 7). Here, θ2 is equal to θ1 or different therefrom within a range of 10°. In this way, inward acting component forces (F3) for preventing a displacement of the male terminal 12 can be secured against an external force acting outward in the plate width direction of the male terminal 12 while the terminal unit 10 is reduced in size. Here, a projecting dimension "a" of the push-up protrusion 50 is smaller than a projecting dimension "b" of the first projecting contact point portion 46 (see FIG. 9). Here, the projecting dimension "a" is a maximum projecting dimension of the push-up protrusion 50 from the flat upper surface of the intermediate part 48 of the second contact portion 28 other than the push-up protrusion 50. The projecting dimension "b" is a maximum projecting dimension of the first projecting contact point portion 46 from the flat upper surface of the side edge part 44 of the second contact portion 28 other than the first projecting contact point portion 46. By reducing the projecting dimension of the push-up protrusion 50, the accommodation recess 20 of the male terminal 12 for accommodating the push-up protrusion 50 can also be made smaller accordingly. As a result, it is possible to suppress an increase in the conduction resistance of the male terminal 12 caused by the formation of the accommodation recess 20.

Figure 5:
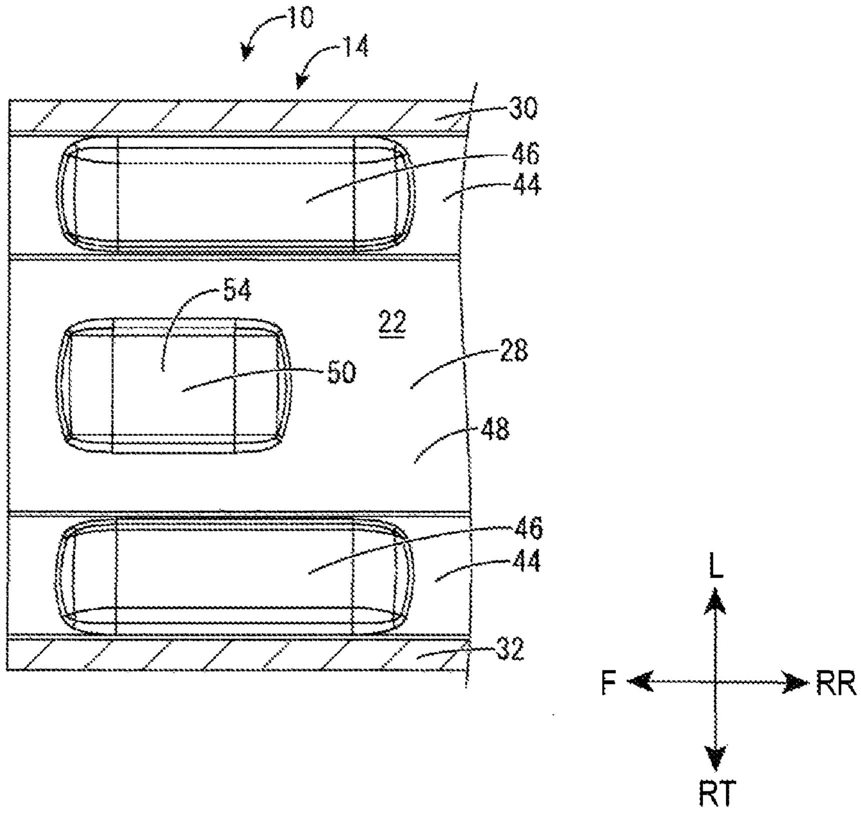
FIG. 5 is an enlarged section when a female terminal shown in FIG. 3 is cut in a horizontal direction and viewed from above.
Figure 7:
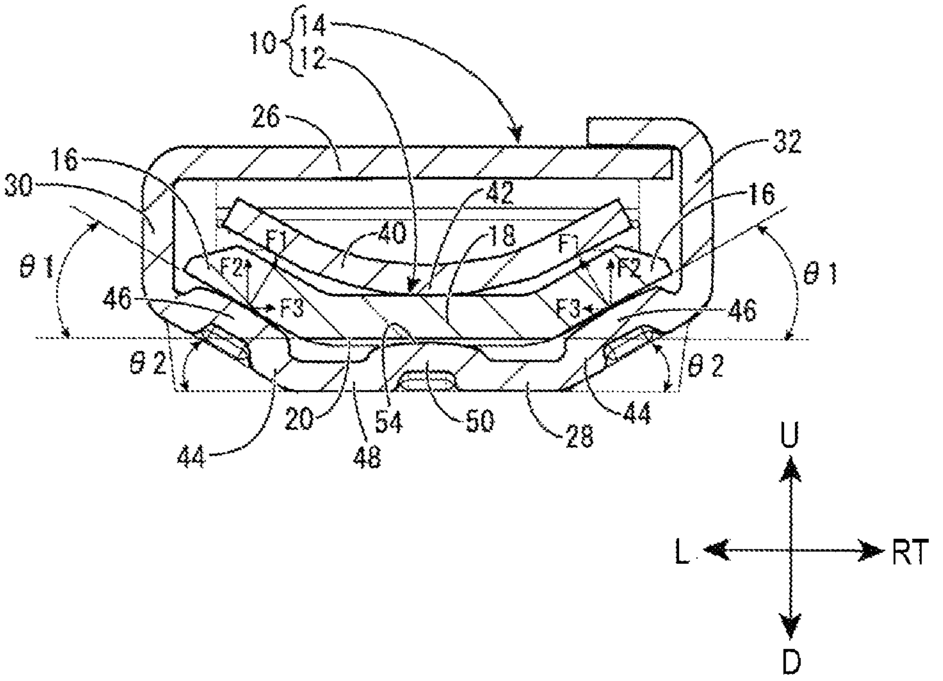
FIG. 7 is an enlarged section along VII-VII in FIG. 6.

As shown in FIG. 7, the pair of side edge parts 44, 44 of the second contact portion 28 include the pair of first projecting contact point portions 46, 46 to be respectively brought into contact with the lower surfaces of the pair of inclined portions 16, 16 of the male terminal 12. Further, as shown in FIG. 5, the respective first projecting contact point portions 46 continuously extend in the front-rear direction, which is the inserting direction of the male terminal 12 into the male terminal press-fit gap 22, on front sides of the pair of side edge parts 44, 44 of the second contact portion 28. Since a contact area between the female terminal 14 and the male terminal 12 can be stably secured in this way, a contact resistance between the female terminal 14 and the male terminal 12 can also be reduced.

The female terminal 14 having such a structure can be manufactured by the following method. For example, a metal flat plate is bent after being pressed and punched, whereby the resilient contact portion 40 and the protection wall 34 are formed. Subsequently, the both side walls 30, 32 are bent from the second contact portion 28 serving as a bottom plate to face each other, and further the first contact portion 26 serving as a ceiling plate continuous from the side wall 30 is bent to face the second contact portion 28, whereby the box-shaped body portion 24 open on both front and rear sides is assembled.

An unillustrated engaging hole is provided to penetrate through a side edge part of the side wall 32, and an unillustrated locking portion to be fit into the engaging hole is provided to project on a side edge part of the first contact portion 26. After the locking portion is fit into the engaging hole, the side edge part of the side wall 32 is bent until coming into contact with the first contact portion 26, whereby the side wall 32 and the first contact portion 26 are engaged and fixed. In this state, the resilient contact portion 40 folded inwardly from the rear end of the first contact portion 26 is arranged in the body portion 24. Finally, the core wire of the unillustrated wire is fixed to the wire connecting portion 25.

Figure 8:
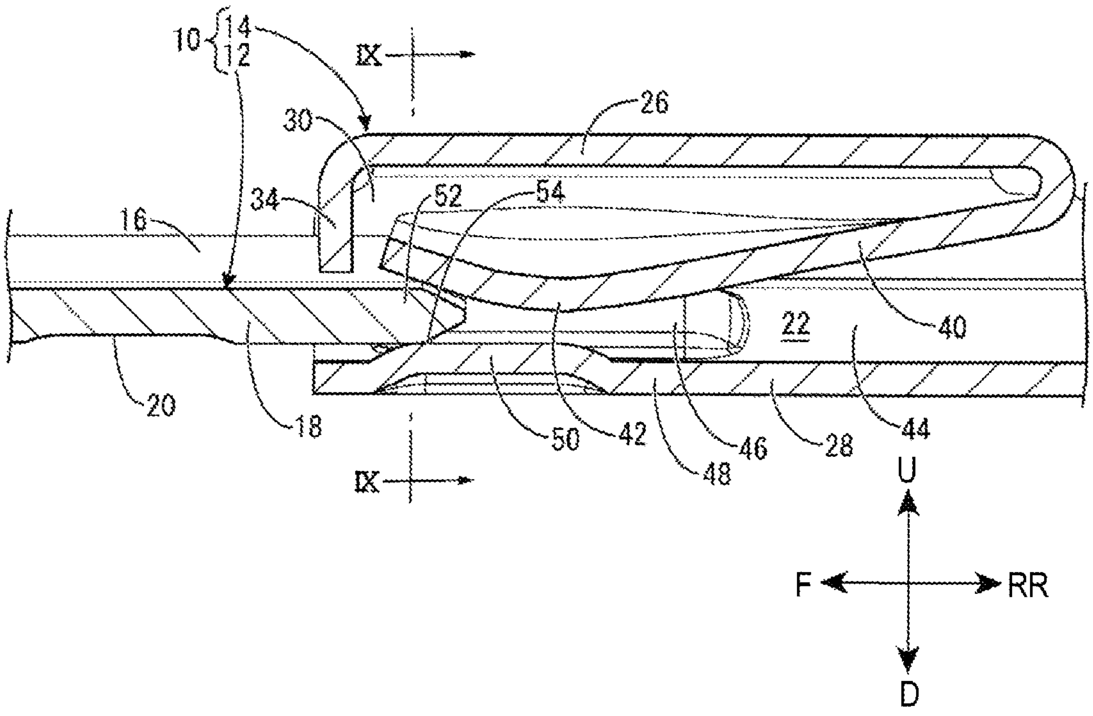
FIG. 8 is an enlarged section along VIII-VIII in FIG. 2.
Figure 9:
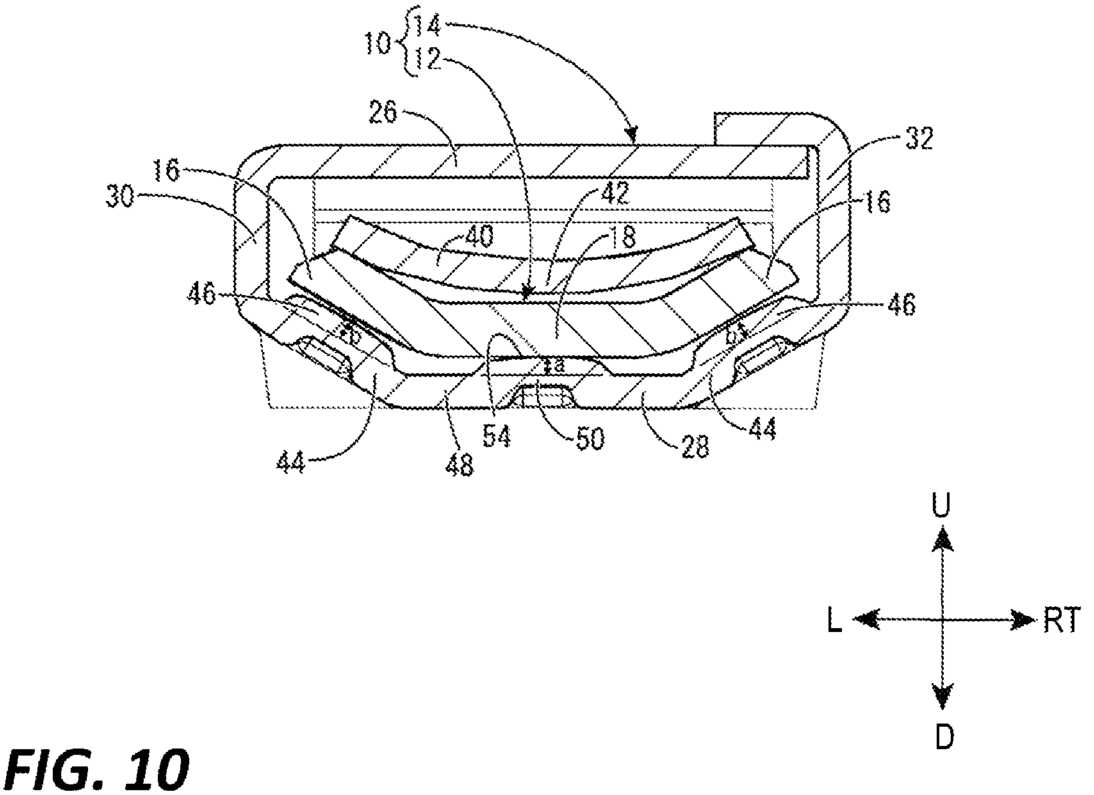
FIG. 9 is an enlarged section along IX-IX in FIG. 8.

According to the terminal unit 10 of the present disclosure structured as just described, if the male terminal 12 is press-fit into the male terminal press-fit gap 22, the tip part 52 of the male terminal 12 first rides on an upper surface 54 of the push-up protrusion 50 of the second contact portion 28 as shown in FIG. 8. This state is realized by a tapered part of the tip part 52 of the male terminal 12 coming into contact with a front end part of the push-up protrusion 50 and being pushed up toward the first contact portion 26. As shown in FIG. 9, the pair of inclined portions 16, 16 of the male terminal 12 are separated from the pair of first and second projecting contact point portions 46, 46 of the female terminal 14. Accordingly, this state is an incomplete connection state where the pair of inclined portions 16, 16 of the male terminal 12 are not connected to the pair of first projecting contact point portions 46, 46 of the female terminal 14. Such a state can be realized by providing the pair of first projecting contact point portions 46, 46 and the push-up protrusion 50 at positions different in the plate width direction of the male terminal 12, which is the first direction. Note that this state is the incomplete connection state before the push-up protrusion 50 of the second contact portion 28 is fit into the accommodation recess 20 of the male terminal 12 press-fit into the male terminal press-fit gap 22.

Further, if the male terminal 12 is press-fit into the male terminal press-fit gap 22 as shown in FIG. 6, the push-up protrusion 50 of the second contact portion 28 is fit into the accommodation recess 20 of the male terminal 12. In this state, the pair of inclined portions 16, 16 of the male terminal 12 are pressed by the pair of first projecting contact point portions 46, 46 of the female terminal 14 as shown in FIG. 7. Accordingly, this state is a complete connection state where the pair of inclined portions 16, 16 of the male terminal 12 are connected to the pair of first projecting contact point portions 46, 46 of the female terminal 14. More particularly, this state is the complete connection state where the push-up protrusion 50 of the second contact portion 28 is fit in the accommodation recess 20 of the male terminal 12 press-fit in the male terminal press-fit gap 22.

According to the terminal unit 10 of the present disclosure structured as just described, in the incomplete connection state before the push-up protrusion 50 is fit into the accommodation recess 20, the male terminal 12 rides on the push-up protrusion 50, whereby the inclined portions 16 of the male terminal 12 are separated upward from the first projecting contact point portions 46 of the female terminal 14. As a result, in press-fitting the male terminal 12 into the male terminal press-fit gap 22, the inclined portions 16 of the male terminal 12 and the first projecting contact point portions 46 of the female terminal 14 can be suppressed or prevented from sliding at contact points. Thus, a problem of plating scraping can be suppressed in parts where the first projecting contact point portions 46 of the female terminal 14 and the inclined portions 16 of the male terminal 12 are in contact. In the complete connection state where the push-up protrusion 50 of the second contact portion 28 is fit in the accommodation recess 20 of the male terminal 12, the inclined portions 16 of the male terminal 12 are pressed by the first projecting contact point portions 46 of the female terminal 14. Since there is no sliding movement in this state, the problem of plating scraping can be suppressed and a stable connected state of the female terminal 14 and the male terminal 12 is maintained.

In the complete connection state, the inclined portions 16 of the male terminal 12 are pressed by the first projecting contact point portions 46 of the female terminal 14 on the both sides in the plate width direction of the male terminal 12 and component forces (F3) acting inward in the plate width direction are generated by reaction forces (F1) from the first projecting contact point portions 46 (see FIG. 7). In this way, even if an external force acting outward in the plate width direction of the male terminal 12 is applied, component forces (F3) acting inward in the plate width direction are generated by this external force and a displacement of the male terminal 12 in the plate width direction can be suppressed. Therefore, a displacement of the male terminal 12 in the plate width direction with respect to the female terminal 14 can be further suppressed, and fine sliding friction between the female terminal 14 and the male terminal 12 due to vibration or the like and an increase of a contact resistance value caused by the fine sliding friction can be suppressed. As described above, both the suppression of plating scraping at the contact points when the male terminal 12 is inserted into and withdrawn from the female terminal 14 and the suppression of a displacement of the male terminal 12 in the plate width direction with respect to the female terminal 14 can be accomplished.

The pair of side edge parts 44, 44 provided with the pair of first projecting contact point portions 46, 46 are bent toward the male terminal press-fit gap 22. In this way, reaction forces (F1) from the pair of first projecting contact point portions 46, 46 in contact with the pair of inclined portions 16, 16 of the male terminal 12 and generated in directions perpendicular to the pair of side edge parts 44, 44 can be caused to act inward in the plate width direction of the male terminal 12 on the both sides in the plate width direction of the male terminal 12. Thus, a force for preventing a displacement of the male terminal 12 can be increased against an external force acting in the plate width direction of the male terminal 12, more advantageously utilizing the reaction forces from the first projecting contact point portions 46. Therefore, a displacement of the male terminal 12 in the plate width direction with respect to the female terminal 14 can be suppressed.

Further, in the second contact portion 28 of the female terminal 14, the first projecting contact point portions 46, 46 and the push-up protrusion 50 can be separately formed in the pair of side edge parts 44, 44 and the intermediate part 48. In this way, the first projecting contact point portions 46, 46 and the push-up protrusion 50 can be separated across the male terminal press-fit gap 22 in the plate width direction of the male terminal 12, which is the first direction. Thus, it can be suppressed that plating scraping caused by a sliding movement of the male terminal 12 against the push-up protrusion 50 affects contact parts with the first projecting contact point portions 46, 46. Therefore, an effect of suppressing plating scraping between the first projecting contact point portions 46, 46 and the pair of side edge parts 44, 44 can be improved.

Further, the second projecting contact point portion 42 of the female terminal 14 is pressed against the flat portion 18 of the male terminal 12 from above, and the first projecting contact point portions 46, 46 of the female terminal 14 are pressed against the pair of inclined portions 16, 16 of the male terminal 12 from below. In this way, the male terminal 12 can be stably held by three contact point portions 42, 46 and 46 of the female terminal 14, wherefore a contact resistance can be reduced.

The female terminal 14 of the present disclosure structured as just described can similarly have functions and effects enjoyable by the aforementioned terminal unit 10. Thus, both the suppression of plating scraping at the contact points when the male terminal 12 is inserted into and withdrawn from the female terminal 14 and the suppression of a displacement of the male terminal 12 in the plate width direction with respect to the female terminal 14 can be accomplished. In addition, the male terminal 12 of the present disclosure structured as just described can also similarly have the functions and effects enjoyable by the aforementioned terminal unit 10.

Modifications

Although the embodiment has been described in detail as a specific example of the present disclosure above, the present disclosure is not limited by this specific description. The present disclosure includes modifications, improvements and the like within a range in which the aim of the present disclosure can be accomplished. For example, the following modifications of the embodiment are also included in the technical scope of the present disclosure.

(1) Although the push-up protrusion 50 and the pair of first projecting contact point portions 46, 46 are provided at the positions separated from each other across the gaps in the plate width direction of the male terminal 12, which is the first direction, as shown in FIG. 7, there is no limitation to this. For example, if the push-up protrusion 50 is provided on a side forward of the first projecting contact point portions 46 in the inserting direction of the male terminal 12, the push-up protrusion 50 and the pair of first projecting contact point portions 46, 46 may be provided at positions different in the first direction while partially overlapping in the first direction.

Figure 10:
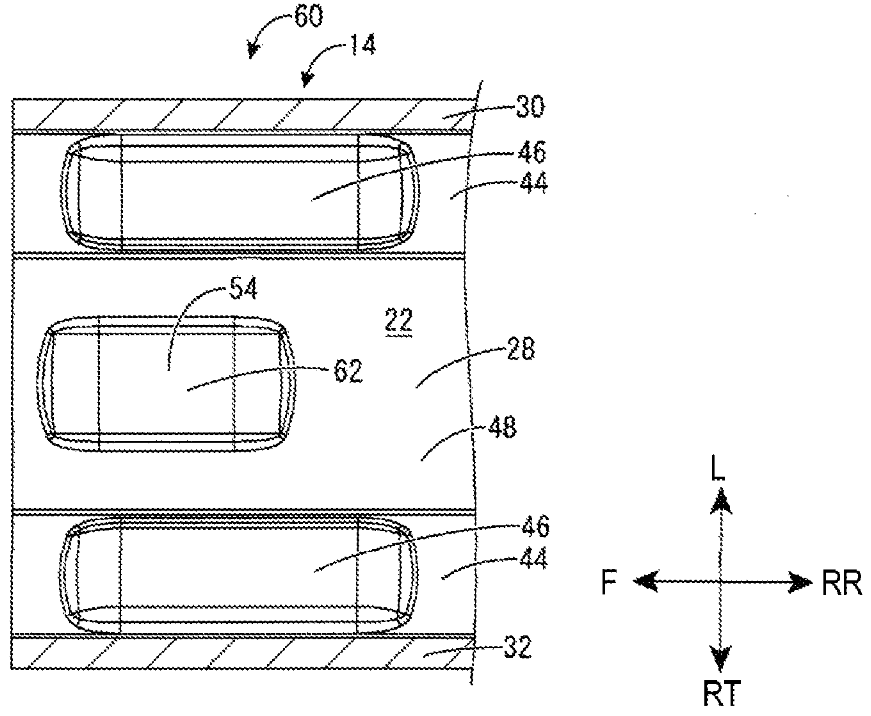
FIG. 10 is a section, corresponding to FIG. 5, showing a terminal unit according to a first modification.

(2) Although the front end parts of the push-up protrusion 50 and the pair of first projecting contact point portions 46, 46 are substantially at the same position in the inserting direction of the male terminal 12 as shown in FIG. 5 in the above embodiment, there is no limitation to this. For example, a front end part of a push-up protrusion 62 may be formed forward of front end parts of a pair of first projecting contact point portions 46, 46 as in a terminal unit 60 of a first modification of the embodiment shown in FIG. 10. That is, the front end part of the push-up protrusion 62 may be arranged in front of (forward of) the pair of first projecting contact point portions 46, 46 in the inserting direction (front-rear direction) of the male terminal 12. In this way, the male terminal 12 can be more reliably suppressed from contacting the first projecting contact point portions 46 before being press-fit into the male terminal press-fit gap 22. Therefore, the problem of plating scraping of the first projecting contact point portions 46 of the female terminal 14 according to the press-fitting of the male terminal 12 can be more reliably suppressed.

Figure 11:
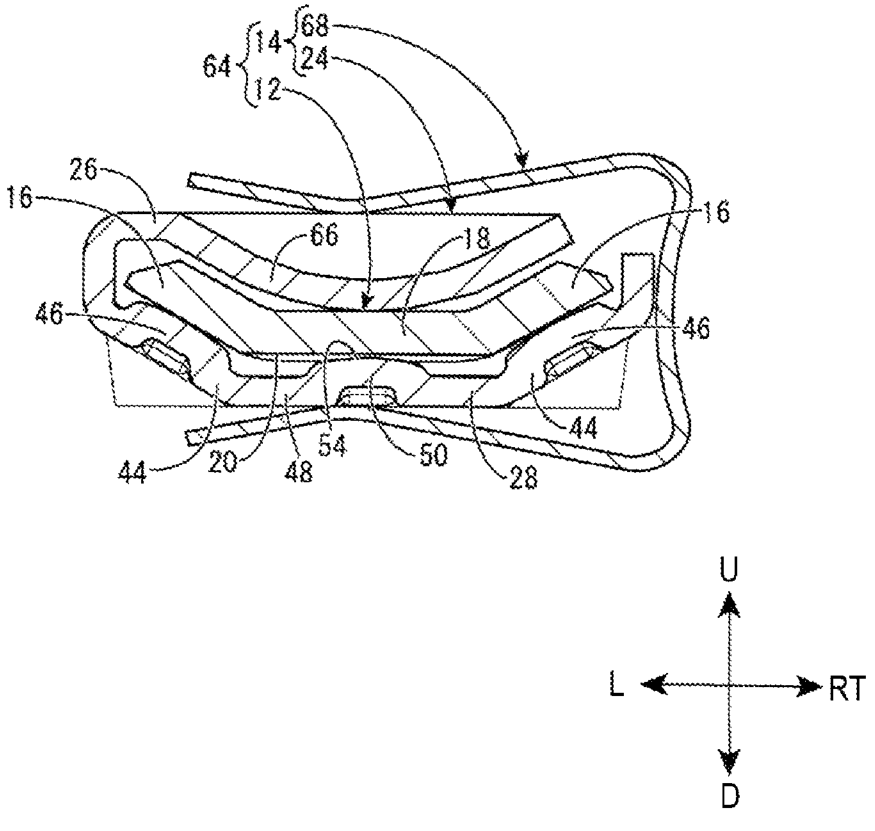
FIG. 11 is a section, corresponding to FIG. 7, showing a terminal unit according to a second modification.

(3) Although biasing between the female terminal 14 and the male terminal 12 is performed by the resilient contact portion 40 in the above embodiment, there is no limitation to this. For example, a dome-shaped protrusion 66 may be provided instead of the resilient contact portion 40 and a clip spring 68 may be used as a biasing means as in a terminal unit 64 of a second modification of the embodiment shown in FIG. 11. The shape of the terminal unit 64 can be simplified and the terminal unit 64 of this modification can be easily formed by a combination with the clip spring 68. As just described, any structure can be adopted for the first and second contact portions of the female terminal as long as the male terminal 12 is allowed to be press-fit into the male terminal press-fit gap 22 and the male terminal 12 can be sandwiched between the first and second contact portions. If at least one of the first and second contact portions is displaceable in a direction opposite to a facing direction across the male terminal press-fit gap 22 and the first and second contact portions are biased in the facing direction across the male terminal press-fit gap 22, arbitrary structures can be adopted.

(4) Although the contact point portion of the female terminal 14 with the upper surface of the male terminal 12 is only one second projecting contact point portion 42 of the resilient contact portion 40 of the female terminal 14 with the flat portion 18 of the male terminal 12 in the above embodiment, there is no limitation to this. A plurality of the second projecting contact point portions 42 may be provided to contact the flat portion 18 or the inclined portions 16.

(5) The shape of the first projecting contact point portion 46 is not limited to the elliptical shape as in the above embodiment. The first projecting contact point portion may have, for example, a hemispherical shape, rectangular parallelepiped shape or cubic shape. In this case, corner parts are preferably chamfered.

(6) Although the male terminal 12 includes the flat portion 18 between the pair of inclined portions 16, 16 in the above embodiment, the flat portion 18 is not essential and the male terminal according to the present disclosure may be shaped such that the inclined portions 16 are coupled in a widthwise center of the male terminal.

(7) Although each first projecting contact point portion 46 continuously extends in the inserting direction of the male terminal 12 into the male terminal press-fit gap 22 in the above embodiment, there is no limitation to this. The first projecting contact point portion may not continuously extend in the inserting direction or a plurality of the first projecting contact point portions may be provided while being spaced apart in the inserting direction.

LIST OF REFERENCE NUMERALS

10 terminal unit (embodiment)
12 male terminal
14 female terminal
16 inclined portion
18 flat portion
20 accommodation recess
22 male terminal press-fit gap
24 body portion
25 wire connecting portion
26 first contact portion
28 second contact portion
30 side wall
32 side wall
34 protection wall
40 resilient contact portion
42 second projecting contact point portion
44 side edge part
46 first projecting contact point portion
48 intermediate part
50 push-up protrusion
52 tip part
54 upper surface
60 terminal unit (first modification)
62 push-up protrusion
64 terminal unit (second modification)
66 dome-shaped protrusion
68 clip spring

What is claimed is:

1. A terminal unit, comprising:

a plate-like male terminal; and a female terminal to be connected to the male terminal, the female terminal including a first contact portion and a second contact portion arranged to face each other across a male terminal press-fit gap, the male terminal being press-fit into and arranged in the male terminal press-fit gap, the first and second contact portions sandwiching the male terminal, the male terminal including a pair of inclined portions on both sides in a first direction intersecting a press-fitting direction into the male terminal press-fit gap, the pair of inclined portions being inclined toward one side in a plate thickness direction of the male terminal, the first contact portion of the female terminal facing a surface of the male terminal on the one side in the plate thickness direction, the second contact portion of the female terminal facing a surface of the male terminal on the other side in the plate thickness direction and including a push-up protrusion projecting toward the first contact portion and a pair of side edge parts respectively facing the pair of inclined portions of the male terminal, the pair of side edge parts including a pair of first projecting contact point portions to be respectively brought into contact with the pair of inclined portions, the pair of first projecting contact point portions and the push-up protrusion being provided at positions different in the first direction, the male terminal including an accommodation recess open in the surface on the other side in the plate thickness direction, arranged closer to a base end than a tip part in the press-fitting direction and capable of accommodating the push-up protrusion, the male terminal being in contact with the push-up protrusion and pushed up toward the first contact portion, whereby the inclined portions of the male terminal are separated from the first projecting contact point portions of the female terminal, in an incomplete connection state where the push-up protrusion of the second contact portion is not fit in the accommodation recess of the male terminal press-fit in the male terminal press-fit gap, and the inclined portions of the male terminal being pressed by the first projecting contact point portions of the female terminal in a complete connection state where the push-up protrusion of the second contact portion is fit in the accommodation recess of the male terminal press-fit in the male terminal press-fit gap.

2. The terminal unit of claim 1, wherein the second contact portion of the female terminal includes an intermediate part located between the pair of side edge parts in the first direction, and the pair of side edge parts are inclined toward the male terminal press-fit gap with respect to the intermediate part.

3. The terminal unit of claim 2, wherein:

the male terminal includes a flat portion arranged between the pair of inclined portions in the plate width direction and an angle of inclination of the pair of inclined portions with respect to the flat portion is θ1, the second contact portion of the female terminal includes an intermediate part in the form of a flat plate arranged between the pair of side edge parts and an angle of inclination of the pair of side edge parts with respect to the intermediate part is θ2, and the angle of inclination θ1 is equal to the angle of inclination θ2 or different therefrom within a range of 10°.

4. The terminal unit of claim 1, wherein the push-up protrusion is provided in the intermediate part of the second contact portion.

5. The terminal unit of claim 1, wherein at least a part of the push-up protrusion is arranged forward of the pair of first projecting contact point portions in an inserting direction of the male terminal.

6. The terminal unit of claim 1, wherein a projecting dimension of the push-up protrusion is smaller than those of the first projecting contact point portions.

7. The terminal unit of claim 1, wherein:

the male terminal includes a flat portion arranged between the pair of inclined portions in the plate width direction, the first contact portion of the female terminal includes a resilient contact portion projecting toward the second contact portion, resiliently deformable in a direction separating from the second contact portion and configured to bias the male terminal toward the second contact portion, and the resilient contact portion includes a second projecting contact portion to be brought into contact with the flat portion of the male terminal.

8. The terminal unit of claim 1, wherein each first projecting contact point portion continuously extends in the press-fitting direction of the male terminal into the male terminal press-fit gap.

9. A female terminal used in the terminal unit of claim 1.

10. A male terminal used in the terminal unit of claim 1.

* * * * *